United States Patent
Arai

[11] 3,973,268
[45] Aug. 3, 1976

[54] CAMERA WITH AUTOMATIC FILM ADVANCE

[75] Inventor: Akihiro Arai, Tokyo, Japan

[73] Assignee: Asahi Kogaku Kogyo Kabushiki Kaisha, Japan

[22] Filed: Dec. 4, 1974

[21] Appl. No.: 529,579

[30] Foreign Application Priority Data
Dec. 5, 1973 Japan.............................. 48-135260

[52] U.S. Cl................................. 354/173; 354/204
[51] Int. Cl.²...................... G03B 1/00; G03B 17/42
[58] Field of Search ............ 352/137, 121; 354/173, 354/171, 170, 204, 172; 242/71.5

[56] References Cited
UNITED STATES PATENTS

| | | | |
|---|---|---|---|
| 3,119,315 | 1/1964 | Lange et al..................... | 354/204 X |
| 3,171,338 | 3/1965 | Winkler et al..................... | 354/171 |
| 3,590,710 | 7/1971 | Uno et al............................ | 354/173 |
| 3,640,201 | 2/1972 | Kimura................................ | 354/173 |
| 3,753,391 | 8/1973 | Kimura et al.................. | 354/173 X |
| 3,754,455 | 8/1973 | Tsujimoto et al................... | 354/173 |

Primary Examiner—L. T. Hix
Assistant Examiner—E. M. O'Connor
Attorney, Agent, or Firm—Steinberg & Blake

[57] ABSTRACT

A camera which is capable of being operated, at the option of the operator, either continuously to make a series of exposures in an automatic manner or in a single-exposure manner according to which the operator may make a single-exposure. In the continuous operating mode, the camera is capable of making exposures either with a preselected time interval from one exposure to the next or in a manner according to which the exposures are made as rapidly as possible taking into consideration the exposure time required for each exposure. Also, the camera is capable of being operated to make bulb exposures. Irrespective of the type of operation selected for the camera, the camera cannot stop operating until the film has been advanced in preparation for making the next exposure and the shutter is in a cocked condition, so that in this way no time is lost as, for example, when the operator decides to make a single exposure after the camera has been operated in a continuous mode.

6 Claims, 2 Drawing Figures

CAMERA WITH AUTOMATIC FILM ADVANCE

BACKGROUND OF THE INVENTION

The present invention relates to cameras.

In particular, the present invention relates to that type of camera which is capable of automatically making a series of photographs as well as making single photographs at the option of the operator, with the interval from one photograph to the next during the continuous operation being predetermined.

One of the drawbacks of conventional cameras of the above general type resides in the fact that the film in the camera must be advanced and the shutter must be cocked before an exposure is made. For example even with cameras which have conventional automatic film-advancing structure, if it is desired to make a bulb exposure it is first necessary to carry out a film-advancing operation after the shutter release member has been restored and the shutter has been closed. In the case of a single lens reflex camera, it is necessary to delay the operations until after the lapse of time required for the mirror to swing down to its normal position.

As a result, with such conventional cameras it is essential to set into the camera a relatively long pause time which starts when the shutter release member has been restored and ends at the beginning of a film-advancing operation. Such extremely long pause intervals are disadvantageous when the camera is operated continuously to make a series of exposures because the speed of this type of operation is necessarily reduced undesirably. If the interval from one exposure to the next during continuous operation is reduced, then with conventional cameras there is a danger that the film-advancing operation starts before the shutter closes while in the case of a single lens reflex camera there is a danger that the film-advancing operation will start before the mirror has swung all the way down to its normal position, and in this latter event there is a danger that the mirror will stop in an improper position.

In order to eliminate the above drawbacks special measures may be required in connection with making bulb-exposures, for example, such as reducing the power voltage and locking the mirror against movement.

SUMMARY OF THE INVENTION

It is accordingly a primary object of the present invention to provide a camera which will avoid the above drawbacks.

In particular, it is an object of the present invention to provide a camera which will operate automatically to advance the film for the next exposure and to simultaneously cock the shutter, whenever any type of camera operation is terminated.

Thus, it is an object of the present invention to eliminate the undesirable time interval essential with conventional cameras when changing from one type of operation to another type of operation.

Thus, it is in general an object of the present invention to provide a structure which is capable of placing a camera in a condition where it is always ready to make an exposure so that when a photograph must be quickly made in order not to lose the opportunity of photographing a fleeting subject, the camera of the invention will be capable of making the required photograph.

It is furthermore an object of the present invention to provide a camera which can achieve these objects while at the same time being capable of making either single exposures or a series of exposures continuously, as well as making bulb exposures.

According to the invention, the camera has an electrical motor means which is operatively connected with a film-advancing means for driving the latter as well as with a shutter-cocking means for cocking a shutter means of the camera in preparation for the next exposure. In addition, the motor means is capable of actuating an automatic shutter-tripping means for automatically tripping a shutter-release means with the latter also being capable of being tripped by a manual tripping means. An electrical circuit means is connected with the electrical motor means for controlling the operation thereof, and this electrical circuit means includes a manually operable switch means capable of being set by the operator to carry out either a continuous operation or a single-exposure operation. When this manually operable switch means is displaced from its position providing for continuous operation to its position providing for a single-exposure operation, the electrical circuit means nevertheless operates in such a way as to maintain the electrical motor means energized to actuate the film-advancing means and the shutter-cocking means in preparation for the next exposure, so that the camera is almost immediately placed in condition ready for a single-exposure operation.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
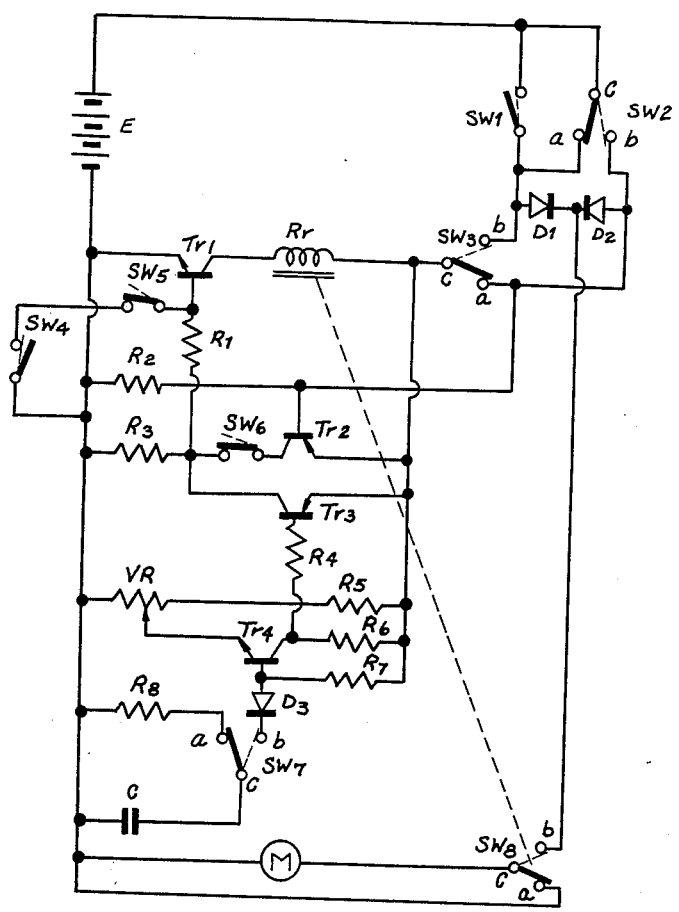
FIG. 1 is a wiring diagram of one possible embodiment of a camera according to the invention.

Referring now to FIG. 1, the camera circuitry illustrated therein includes a power source E which forms part of the illustrated circuit means. This circuit means includes a manually operable switch means part of which is formed by the switch $SW_2$, this latter switch being accessible to the operator to be manipulated for achieving different types of operation as set forth below. The circuit means further includes a control switch means $SW_3$ which is automatically responsive to advance of the film for assuming one position and to release of the shutter for assuming another position, as will be apparent from the description below. The control switch means $SW_3$ is electrically connected with a solenoid RY which in turn is electrically connected with a switching transistor $Tr_1$. The power source E is connected at its positive terminal to the terminal $c$ of the manually operable switch $SW_2$. At its negative terminal the source E is connected with the emitter of the switching transistor $Tr_1$. The terminals $a$ and $b$ of the control switch means $SW_3$ are respectively connected electrically with the terminals $b$ and $a$ of the manually operable switch $SW_2$. The terminal $c$ of the control switch means $SW_3$ is electrically connected through the solenoid RY to the collector of the switching transistor $Tr_1$. The manually operable switch means of the circuit means illustrated in FIG. 1 further includes a selecting switch $SW_1$ which is electrically connected between the positive terminal of the source E and the terminal $b$ of the control switch means $SW_3$. This selecting switch means $SW_1$ is capable of being switched over between a single-exposure position and a continuous exposure position.

The circuit means of FIG. 1 further includes a switch $SW_8$ which is controlled by the solenoid RY so as to form a relay type of circuit therewith. The terminal $a$ of the switch $SW_8$ is electrically connected to the negative terminal of the source E while the terminal $b$ of the switch $SW_8$ is connected to the pair of diodes $D_1$ and $D_2$, at a junction therebetween, these diodes being connected in series and in opposite directions between the terminals $a$ and $b$ of the manually operable switch means $SW_2$. Also, the switch $SW_8$ is connected at its terminal $c$ to the negative terminal of the source E by way of the electrical motor means M.

The electrical circuit means of the invention also includes switching transistors $Tr_2$ and $Tr_3$, and $Tr_4$. The transistor $Tr_2$ is connected at its base to the negative terminal of the source E by way of a resistor $R_2$, and the base of transistor $Tr_2$ is also electrically connected with the terminal $a$ of the control switch means $SW_3$. The emitter of transistor $Tr_2$ is electrically connected with the terminal $c$ of the control switch means $SW_3$, while the collector of transistor $Tr_2$ is electrically connected with the negative terminal of the source E through a bulb switch means $SW_6$ and a resistor $R_3$. A junction between the latter resistor and the bulb switch means $SW_6$ is electrically connected to the base of the transistor $Tr_1$ through a resistor $R_1$. The base of the switching transistor $Tr_1$ is electrically connected to the negative terminal of the source E by way of a series connection between a bulb switch means $SW_5$ and a shutter-responsive switch means $SW_4$. This latter switch means $SW_4$ operates in synchronism with the opening and closing of the shutter in a manner described below. The pair of bulb switch means $SW_5$ and $SW_6$ are adapted to be opened by the operator when the camera is set for making bulb exposures.

The emitter, collector and base of switching transistor $Tr_3$ are respectively connected to the terminal $c$ of the control switch means $SW_3$, to the junction between the resistor $R_3$ and the bulb switch means $SW_6$, and to the collector of switching transistor $Tr_4$ through a resistor $R_4$. Between the terminal $c$ of control switch means $SW_3$ and the negative terminal of the source E are a resistor $R_5$ and a variable resistor VR which are connected in series, with the sliding terminal of the variable resistor VR being electrically connected to the emitter of the switching transistor $Tr_4$. The collector and base of the switching transistor $Tr_4$ are connected respectively to the terminal $c$ of the control switch means $SW_3$ through resistors $R_6$ and $R_7$, as illustrated in FIG. 1.

The transistor $Tr_2$ forms part of a bypass circuit means, which forms part of the circuit means shown in FIG. 1, and this bypass circuit means serves to bypass a timing circuit means of the electrical circuit means which is shown in FIG. 1, this timing circuit means serving to time the interval from one exposure to the next when the circuit means is set to carry out a series of exposures continuously in a fully automatic manner. This timing circuit means includes a release switch means $SW_7$ having a terminal $b$ connected to the base of the switching transistor $Tr_4$ by way of a diode $D_3$, for the purpose of preventing discharge of a timing capacitor C connected between the negative terminal of the source E and the terminal $c$ of the release switch means $SW_7$. The terminal $a$ of this release switch means $SW_7$ is connected through a resistor $R_8$ to the negative terminal of the source E.

In FIG. 1 the electrical circuit means of the invention is illustrated in a condition where the camera is stopped with the film having been advanced so that the next unexposed frame is in a position for exposure and with the shutter having already been cocked. In the illustrated condition, the manually operable switch means $SW_2$ is closed at its terminal $a$. The terminal $b$ of switch means $SW_2$ forms part of a manual power supply circuit which includes the power source E, terminal $b$ of the switch $SW_2$, terminal $a$ of control switch means $SW_3$, solenoid RY and switching transistor $Tr_1$. Thus, since the switch means $SW_2$ is open at its contact $b$, this manual power supply circuit is in an open position. Moreover, since the control switch means $SW_3$ is closed at its terminal $a$, an automatic power supply circuit made up of the power source E, terminal $a$ of switch $SW_2$, terminal $b$ of control switch means $SW_3$, solenoid RY and switching transistor $Tr_1$ is also in an open position. Thus, in the illustrated position where the camera is not operating, the solenoid RY is not energized and as a result the relay switch means $SW_8$, which is controlled by the solenoid RY is closed at its terminal $a$. In other words when the relay is unenergized the relay switch $SW_8$ is normally closed at its terminal $a$, and in this position the motor M is unenergized because both of its terminals are short-circuited as illustrated in FIG. 1.

Assuming now that the operator of the camera wishes to carry out a series of exposures in a continuous manner, then the manually operable switch means $SW_2$ which is accessible to the operator at the exterior of the camera is displaced by the operator so that it becomes closed at the terminal $b$. The result is that the manual power supply circuit is closed and the electronic circuit means shown in FIG. 1, composed of the various switching transistors and other components, becomes energized. As a result the switching transistors $Tr_4$ and $Tr_3$ conduct sequentially, while the switching transistor $Tr_2$ remains in a non-conductive state because the emitter and base thereof are short circuited by way of the control switch means $SW_3$. When either one of the switching transistors $Tr_2$ and $Tr_3$ transfer to a conductive state, then current will flow through the switching transistor $Tr_1$ to render the latter conductive. Accordingly, under the above conditions the switching transistor $Tr_3$ becomes conducting, and the switching transistor $Tr_1$ also becomes conducting so as to energize the solenoid RY for transferring the relay switch $SW_8$ from the terminal $a$ to the terminal $b$.

Under these conditions the motor means M becomes energized. It will be seen that current can flow to the motor means M through the diode $D_1$ when the switch means $SW_2$ is closed at its terminal $a$ and through the diode $D_2$ when the switch means $SW_2$ is closed at its terminal $b$. When the motor M is energized it rotates and advances the film in a known way. Of course, the film has already been advanced before the switch means $SW_2$ has been closed at its terminal $b$, and the result of the energizing of the motor M under these conditions is to cause an automatic shutter-tripping means described below to trip a shutter release means in order to open a shutter means and start an exposure. The tripping of the shutter release means causes, also in a manner described below, the control switch means SW$_3$ automatically to change over from its terminal $a$ to its terminal $b$, but this operation of the control switch means SW$_3$ will not open the circuit because the selecting switch means SW$_1$ which forms part of the manually operable switch means of the circuit means as shown in FIG. 1, has preliminarily been closed. Thus, when it is desired to carry out a continuous operation according to which a series of exposures will be automatically made, the operator will close the switch means SW$_1$, while when it is desired to make single exposures the switch means SW$_1$ is opened by the operator. Thus because the switch means SW$_1$ has been preliminarily closed, even when the control switch means SW$_3$ automatically responds to tripping of the shutter to change over to its contact $b$, the circuit remains closed and the shutter-opening operation is reliably completed. Thus, even though the manually operable switch means SW$_2$ has been initially displaced to its terminal $b$ so as to close the manual power supply circuit, the automatic power supply circuit is still closed by way of the closed selecting switch SW$_1$, although this automatic power supply circuit can also be closed by way of the terminal $a$ of the switch SW$_2$. Moreover, the switching transistor Tr$_1$ is in a conducting state whenever the control switch means SW$_3$ is closed at its terminal $a$ or $b$, under the above conditions, so that the solenoid RY remains energized to hold the relay switch SW$_8$ closed at its terminal $b$ so as to keep the motor M energized.

However, even though the motor means M operates to trip the shutter, opening the latter to start an exposure, there will be no undesired movement of the film during exposure because the shutter-responsive switch means SW$_4$ responds automatically to and in synchronism with the shutter in order to assume a closed position whenever the shutter opens. It will be seen from FIG. 1 that the closing of the shutter-responsive switch means SW$_4$ serves to short circuit the transistor Tr$_1$ between its emitter and base, so that the transistor Tr$_1$ automatically becomes non-conducting when the shutter is in its open position. The result is that at this time the solenoid RY is deenergized and in response to the deenergizing of the solenoid the switch SW$_8$ switches over from its terminal $b$ to its terminal $a$, so that the motor stops during actual film exposure.

However, upon completion of an exposure, with the closing of the shutter the switch SW$_4$ automatically opens, in response to closing of the shutter, so that the transistor Tr$_1$ again becomes conductive in order to energize the solenoid RY. The result is that the relay switch SW$_8$ transfers from its terminal $a$ to its terminal $b$, so that the motor M again starts to rotate, restoring the shutter release means in a known way and at the same time switching over the release switch means SW$_7$ from its terminal $a$ to its terminal $b$. As a result the electrical current flowing through the resistor R$_7$ is received by the timing capacitor C so as to render the switching transistor Tr$_4$ non-conductive. After a preselected interval has elapsed, the potential of timing capacitor C at its terminal connected to the terminal $c$ of switch SW$_7$ exceeds the emitter potential of transistor Tr$_4$ which is preset by way of resistor R$_5$ and variable resistor VR, so that the transistor Tr$_4$ again becomes conducting. It will be seen that with the above circuitry it is possible to adjust the interval during which transistor Tr$_4$ remains in a non-conductive state by controlling the variable resistor VR so as to vary the emitter potential of the transistor Tr$_4$. Inasmuch as this transistor remains non-conductive for a preselected interval, the transistor Tr$_3$ also remains non-conductive for a preselected interval. Inasmuch as the manually operable switch means SW$_2$ is closed at its terminal $b$, the transistor Tr$_2$ also remains in a non-conductive state. As a result the transistor Tr$_1$ remains non-conductive for a preselected interval during which the energizing of the solenoid RY is interrupted for the preselected interval so that the relay switch SW$_8$ remains during a preselected interval at its terminal $a$, causing the motor M to be inoperative for a preselected interval. After the interval required for charging the capacitor C has elapsed, the switching transistors Tr$_4$, Tr$_3$ and Tr$_1$ become conducting so as to energize the solenoid RY, and thus the relay switch SW$_8$ is switched over to become closed at its terminal $b$ in order to initiate the rotation of the motor M again. Now the motor M will actuate a film advancing means and will cock the shutter in a known way. When the film advancing operation has been completed, the release switch means SW$_7$ is switched over from its terminal $b$ to its terminal $a$, so that the timing capacitor C will now discharge through the resistor R$_8$, and in response to the termination of the film-advancing operation the control switch means SW$_3$ returns to its terminal $a$. In this way the circuitry automatically returns after a predetermined interval to its initial condition and the above operations are repeated so that a series of exposures will be automatically made with a predetermined interval taking place from one exposure to the next, and these operations will go forward as long as the switch means SW$_2$ remains closed at its contact $b$, after the switch means SW$_1$ has been preliminarily closed as described above.

Of course, the above continuous operation with a preselected interval from one exposure to the next will be terminated as soon as the operator displaces the switch means SW$_2$ from its terminal $b$ to its terminal $a$. The result of this operation is that the manual power supply circuit is opened while the automatic power supply circuit is closed. The manually operable shutter-tripping plunger of the camera, which is accessible to the operator, is depressed so as to trip the shutter, causing the control switch means SW$_3$ to be displaced from its terminal $a$ to its terminal $b$, so that the above continuous operations will now go forward as long as the operator maintains the manually operable shutter-triping means depressed. At this time the bypass circuit means which includes the transistor Tr$_2$ is rendered effective so that it is possible to carry out a series of exposures in a continuous manner without the preselected interval from one exposure to the next provided by way of the timing circuit means. The transistor Tr$_2$ will only be momentarily short circuited when the switch means SW$_3$ transfers from its terminal $b$ to its terminal $a$ at the end of a film-advancing operation, but since the shutter-tripping plunger is maintained depressed the switch means SW$_3$ will immediately return from the terminal $a$ to its terminal $b$, so that the continuous series of exposures will be carried out without the timing interval provided by way of the timing circuit. In this way the bypass circuit means will effectively bypass the timing circuit means. Thus, at this time the transistor Tr$_1$ is directly controlled by the bypass transistor Tr$_2$. Thus, under these condition even if the transistors Tr$_4$ and Tr$_3$ become non-conducting, the transistor Tr$_2$ remains conductive and therefore the transistor Tr$_1$ is held in a conductive state to energize the motor M. Therefore under these conditions the only interruption in the operation of the motor M results from the closing of the switch $SW_4$ upon opening of the shutter, but as soon as the shutter closes, the switch $SW_4$ opens to terminate the short-circuiting of the transistor $Tr_1$, and the operations resume, with the film being advanced and the shutter being cocked while the release of the shutter is then immediately carried out by way of the manually depressed plunger of the camera. Thus the interval provided by way of the timing circuit means will have no effect and the motor M stops only momentarily when the switch $SW_3$ is momentarily closed at its contact a and when the shutter opens, serving to automatically close the switch $SW_4$. Therefore, it is apparent that the manually operable switch means $SW_2$ has a pair of positions according to which when it engages its terminal b the continuous operation can be carried out with a preselected interval from one exposure to the next while when the switch means $SW_2$ is closed at its terminal a the exposures will be carried out as rapidly as possible with the only limitation being the exposure time required for each exposure. When it is desired to terminate this more rapid series of exposures, the operator need only release the shutter-tripping plunger which will prevent the control switch means $SW_3$ from returning to its terminal b after it has been transferred to its terminal a at the end of a film-advancing operation, and thus under these conditions the camera operation will terminate.

As is apparent from the above description, when terminating an operation where the switch $SW_2$ is closed at its terminal b, the operator will only be required to transfer the switch $SW_2$ over to its contact a, and the operations will automatically continue until the control switch means $SW_3$ is closed at its contact a, so that the operations necessarily terminate with the shutter cocked and the film already advanced for the next exposure. In the same way, when the switch $SW_2$ remains at its terminal a and the operator releases the shutter-tripping plunger, the operations will nevertheless continue automatically until the switch means $SW_3$ becomes closed at its terminal a, so that under these conditions also termination of the operation of the camera is prevented until the shutter is cocked and the next film frame has been advanced to a position to be exposed. Therefore, after either of these modes of continuous operation, the camera is automatically placed in a position where it is immediately ready for the next exposure. Thus, after either of the above modes of continuous operation, the circuit means of the invention will again assume the condition illustrated in FIG. 1.

Assuming now that it is desired to make a single exposure, it will be seen that the shutter is already cocked and the next film frame has already been advanced into a position to be exposed, so that such a single exposure can be immediately made. A single exposure can be made with the structure of the invention in either of two ways. It is possible, for example, for the operator to simply depress and release the shutter-tripping plunger which is accessible at the exterior of the camera, so that such a manually operable shutter-tripping means may be utilized to displace the control switch $SW_3$ from its terminal a to its terminal b, the switch $SW_1$ having preliminarily been opened in order to set the circuitry for a single exposure, as described above. The result is that the circuit will now be completed with the automatic power supply circuit which includes the terminal a of the switch $SW_2$, the latter switch now being closed at its terminal a, and since the release of the shutter has transferred the switch $SW_3$ to its terminal b, the solenoid RY can be energized. However, when the shutter opens the switch $SW_4$ closes automatically as described above to short circuit the transistor $Tr_1$. However as soon as the exposure is completed, the closing of the shutter will open the switch $SW_4$ so that the motor M will be energized in the manner described above. In other words the relay solenoid RY will become energized to displace the switch $SW_8$ to its terminal b, and the motor will now operate until the film is advanced and the shutter cocked, with the control switch $SW_3$ automatically being displaced at the end of the film-advancing operation to its terminal a, thus returning the parts to the condition shown in FIG. 1, and a single exposure has been made in this way.

However, it is also possible to make a single exposure by displacing the manually operable switch means $SW_2$ first to the terminal b thereof and then back to the terminal a thereof, so that from this standpoint the switch means $SW_2$ also forms a manually operable means for tripping the shutter. With a single exposure made in this manner the selecting switch $SW_1$ has of course already been placed in its open position which is the single-exposure position for this switch. When the operator momentarily places the switch $SW_2$ in contact with its terminal b, the circuit will be completed through solenoid RY so that the motor M is momentarily energized in order to actuate the automatic shutter-tripping means to trip and open the shutter, and of course the switch $SW_4$ automatically closes to short circuit the transistor $Tr_1$ to prevent the motor from operating during actual film exposure. Of course, the transfer of the switch $SW_3$ from its terminal a to its terminal b in response to release of the shutter will open the circuit momentarily to deenergize solenoid RY in this way also, but the circuit is in a condition to be closed as soon as the operator returns the switch $SW_2$ into engagement with its terminal a, and for a single exposure operation the operator will maintain the switch $SW_2$ closed at its terminal b only momentarily as pointed out above. Therefore under these conditions as soon as the switch $SW_4$ opens upon closing of the shutter the transistor $Tr_1$ will become energized to cause the relay coil RY to become energized for closing the switch $SW_8$ at its terminal b, to energize the motor and thus advance the film and cock the shutter in preparation for the next exposure. It will be noted that under these conditions as soon as the switch $SW_4$ opens the automatic power supply is completed through the terminal a of the switch $SW_2$ and through the terminal b of the switch $SW_3$, and the bypassing circuit transistor $Tr_2$ is not short circuited because the switch $SW_3$ is closed at its terminal b and thus irrespective of the interval provided by the timing circuit the transistor $Tr_2$ will maintain the transistor $Tr_1$ in its conductive state. Thus, under these conditions the motor M will operate to restore the release member and of course the release switch $SW_7$ will still be switched over to its terminal b. In a manner similar to operations taking place during the continuous mode, the transistors $Tr_4$ and $Tr_3$ will assume their non-conducting state for the preset interval while the transistor $Tr_2$ remains in its conducting state and the transistor $Tr_1$ maintains its conducting state to maintain the operation of the motor for switching over the control switch means $SW_3$ from its terminal b to its terminal a when the film-advancing operation has been completed. Since at this time the switch $SW_2$ is closed at its terminal $a$ and a manual power supply circuit is in its open position, the solenoid RY is deenergized to transfer the relay switch $SW_8$ over to its terminal $a$ to stop the motor. Thus under the above conditions for a single exposure the switch $SW_4$ will prevent movement of the film during actual exposure thereof while at the end of the single-exposure operation it will be seen that the film has also been advanced in preparation for the next exposure and the shutter is also already cocked, so that when the operations terminate at the end of a single exposure the circuitry again has the condition shown in FIG. 1 and the camera is ready either to carry out another single exposure or the switch $SW_1$ can be closed and the operations can go forward as described above in either of the continuous modes of operation.

Assuming now that it is desired to make a bulb exposure, according to which the shutter is maintained open by the operator while the shutter release member is held in its release position with the shutter closing only upon restoration of the release member to its initial position. In this way it is possible to make a bulb exposure according to which the exposure time is manually controlled by the operator. With a camera which has the automatic film-advancing structure of the present invention, the exposure time can be controlled by displacing the switch $SW_2$ from its terminal $a$ to its terminal $b$, with the shutter remaining open during this interval, while the shutter will close upon return of the switch $SW_2$ back to its terminal $a$. When making a bulb exposure, in a manner similar to a single-exposure, the selecting switch means $SW_1$ is maintained in its open position. However, both of the bulb switch means $SW_5$ and $SW_6$ are opened by the operator when the camera is set for a bulb exposure, and these bulb switches $SW_5$ and $SW_6$ are maintained open by operation of the switch $SW_2$ which when displaced under these conditions to its terminal $b$ will maintain the bulb switches $SW_5$ and $SW_6$ open. Thus, the operations at this time are very similar to those in connection with making a single-exposure by momentarily placing the switch $SW_2$ in engagement with its terminal $b$. Thus, assuming that it is desired to make a bulb exposure, the switches $SW_5$ and $SW_6$ will have been opened, the switch $SW_1$ is its open position, and the operator places the switch $SW_2$ in engagement with its terminal $b$. The result is that the motor M becomes energized through the manual power supply circuit as described above in order to actuate the motor-driven shutter tripping means to trip and open the shutter and of course to displace the switch $SW_3$ from its terminal $a$ to its terminal $b$. Therefore, the circuit through the solenoid RY opens immediately upon release and opening of the shutter, and the motor M stops operating since the deenergized relay coil RY causes the relay switch $SW_8$ to be closed at its terminal $a$, with the resulting short circuiting of the motor M as described above.

After the operator manually maintains the switch $SW_2$ in engagement with its terminal $b$ for the period desired for exposure of the film, the operator will return the switch $SW_2$ to its terminal $a$. Under these conditions since the switch $SW_3$ is closed at its terminal $b$, the motor will immediately start operating inasmuch as the circuit through the solenoid RY will be closed. It is to be noted that at this time the switch $SW_5$ is still in its open condition, so that in order for the motor to start it is not necessary for the shutter first to close in order to open the switch $SW_4$. Accordingly, as soon as the operator returns the switch $SW_2$ over to its terminal $a$, the motor itself brings about a restoration of the release means and a closing of the shutter, so that the operations take place more rapidly than in the case where the shutter must first close to open the switch $SW_4$. Thus simultaneously with the return of the switch $SW_2$ over to its terminal $a$, the motor starts rotating to restore the release member and close the shutter. In connection with restoration of the release member the release switch means $SW_7$ is transferred to its terminal $b$, and in a manner similar to the continuous mode of operation the transistors $Tr_4$ and $Tr_3$ remain non-conducting for a preset interval determined by the timing circuit. However, inasmuch as the switch $SW_2$ is closed at its terminal $a$, and the control switch means $SW_3$ is still in engagement with its terminal $b$, the transistor $Tr_2$ is not short circuited so that the bypass circuit would be capable of assuming a conductive state except that the bulb switch means $SW_6$ is in its open position maintaining the over all circuit in a non-conducting state. Therefore, the transistor $Tr_1$ remains in a non-conducting state during the interval determined by the transistors $Tr_3$ and $Tr_4$ so that the motor M remains unenergized during the interval determined by the timing circuit means.

Thereafter, the transistors $Tr_4$, $Tr_3$, and $Tr_1$ will again resume their conductive state to bring about rotation of the motor by way of the switch $SW_8$ which switches over to its terminal $b$ in response to energizing of the solenoid RY. Now the rotation of the motor will serve to advance the film and cock the shutter. Upon completion of the film-advancing operation the switch $SW_7$ returns to its terminal $a$, enabling the capacitor C to discharge. Under these conditions when the switch means $SW_3$ returns to its terminal $a$ upon completion of the film-advancing operation, the solenoid RY becomes deenergized so as to return the relay switch $SW_8$ to its terminal $a$ in order to stop the motor, and thus at the end of a bulb-exposure operation the parts will again resume the condition shown in FIG. 1 with the bulb switches $SW_5$ and $SW_6$ being closed when the operator sets the camera for a normal single-exposure or continuous exposure operation.

It is thus apparent that with the structure of the invention as described above, it is possible to eliminate a useless pause interval in connection with carrying out a single-exposure, for example, after termination of operation in a continuous mode. Therefore, with the invention it becomes possible to eliminate the danger of missing the opportunity to photograph a given object because of the delay required to advance the film and cock the shutter. Depending upon the particular exposure time, it is clear that with the invention the film will be advanced as part of each exposure cycle. Furthermore, it is possible with the invention to carry out bulb exposures in a highly effective manner as set forth above.

Figure 2:
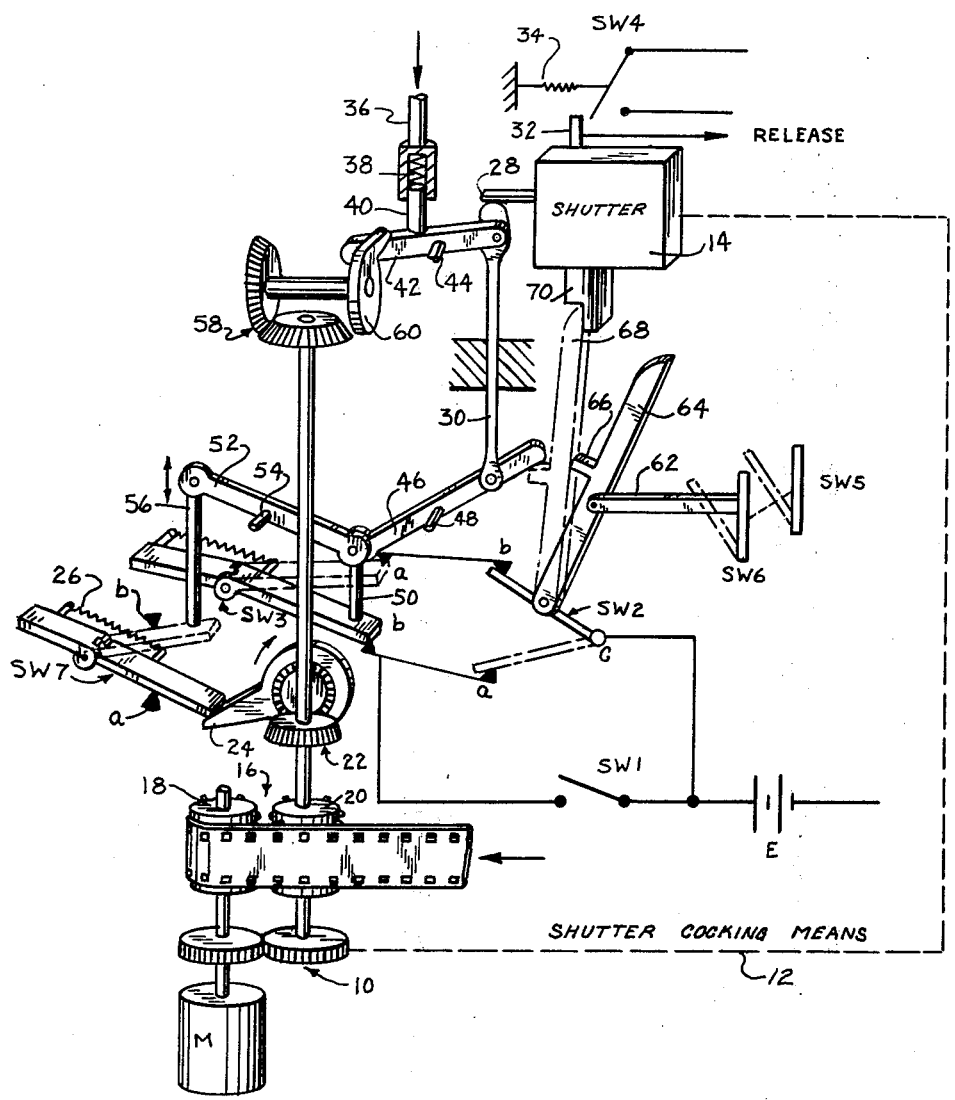
FIG. 2 is a schematic representation of part of the structure of the camera which is used with part of the circuitry of FIG. 1.

Many different types of structures are available for cooperating with the circuitry shown in FIG. 1 and described above in order to provide the operations set forth above. One example of such a structure is shown schematically in FIG. 2. Thus, FIG. 2 shows the motor M connected through a suitable transmission 10 to a schematically illustrated shutter-cocking means 12 for cocking the shutter means 14. At the same time, the motor M serves through the transmission 10 to operate the film-advancing means 16 which includes the takeup spool 18 and the film-advancing sprocket 20. The shaft which rotates the sprocket 20 is extended to act through a bevel gear transmission 22, for example, on a rotary cam 24 in order to cause the latter to displace the release switch means $SW_7$ from its contact $a$ to its contact $b$ as illustrated in FIG. 2. The switch means $SW_7$ is illustrated as having an over-center spring 26 which will snap the switch means $SW_7$ into engagement with its terminal $b$ as soon as the switch means $SW_7$ has been displaced through a certain increment by the cam 24. At the same time, the cam 24 during its continued rotary movement will actuate the switch means $SW_3$ so as to displace it from its terminal $b$ to its terminal $a$ when a film-advancing operation has been completed. This switch means $SW_3$ is also illustrated as including an over-center spring which will snap the switch means $SW_3$ into engagement with its terminal $a$ as soon as the switch means $SW_3$ has been displaced through a certain increment by the cam 24 at the end of a film-advancing operation.

The source E is indicated in FIG. 2 connected through the manually operable switch means $SW_1$, $SW_2$ as described above, to the terminals $a$ and $b$ of the switch means $SW_3$.

The shutter means 14 is tripped by movement of a known tripping element 28 which is situated in the path of movement of a shutter release means 30. The illustrated shutter release means is in the form of a simple rod which is guided for vertical movement, as viewed in FIG. 2, and during such vertical movement the top end of the rod 30 of FIG. 2 will displace tripping element 28 in order to release the shutter 14 which will then open. The shutter means 14 includes an element 32 which is schematically illustrated and moves to the right as viewed in FIG. 2, in response to opening of the shutter, so as to close the switch $SW_4$ in order to short circuit the transistor $Tr_1$ as described above, whenever the shutter opens, and of course at the end of a predetermined exposure time the shutter means 14 will automatically close in order to enable the switch $SW_4$ to again assume its open position, for example by way of the schematically illustrated spring 34, so that the motor will agains become energized as pointed out above.

The release means 30 is capable of being manually actuated by depression of a shutter release plunger 36 which is accessible to the operator and forms part of a manually operable shutter-tripping means. This plunger 36 acts through a spring 38, for a purpose described below, on a pin 40 which serves to turn a lever 42 about a pivot pin 44 in a counterclockwise direction, as viewed in FIG. 2. This lever 44 is pivotally connected to the rod 30 so as to raise the latter in response to depression of the plunger 36, and in this way the shutter release means 30 can be manually actuated to trip the shutter means 14.

The shutter release means 30 is pivotally connected at its lower end, as viewed in FIG. 2, to a lever 46 which is turnable about a stationary pivot 48, and the lever 46 is pivotally connected with a rod 50 situated over the movable blade of the switch means $SW_3$. Thus, whenever the rod 30 is raised to trip the shutter means 14, the rod 50 will be displaced downwardly, as viewed in FIG. 2, in order to automatically displace the control switch means $SW_3$ from its terminal $a$ to its terminal $b$, while on the other hand the cam 24 when returning the switch means $SW_3$ to its terminal $a$, as described above at the end of a film-advancing operation, will also act through the switch means $SW_3$ on the rod 50 to turn the lever 46 in a clockwise direction, as viewed in FIG. 2, in order to restore the release means 30 to its initial position.

It will be noted that the rod 50 is also pivotally connected to a lever 52 which is turnable about a stationary pivot 54 and which is pivotally connected to a rod 56 situated over the switch means $SW_7$. Thus, upon restoration of the release means 30 to its initial position the rod 56 will also move downwardly to return the switch means $SW_7$ into engagement with its terminal $a$ so that the capacitor C can discharge as described above.

The shaft which rotates the film-advancing sprocket 20 is also extended to act through a transmission 58 on a cam 60 which serves to turn the lever 42 independently of the plunger 36, so that this structure 58, 60 forms the automatically operable shutter-tripping means driven by the motor M for raising the rod 30 so as to actuate the release means to trip the shutter means 14.

It is thus apparent that with this structure when operating in a continuous mode with the switch means $SW_2$ in engagement with its terminal $b$, the motor itself will actuate the automatic shutter-tripping means 58, 60 in order to trip the shutter even though the operator does not actuate the plunger 36. Also, when making a single exposure by momentarily placing the switch means $SW_2$ in engagement with its terminal $b$ before returning it to its terminal $a$, the motor will actuate the shutter-tripping means 58, 60 in order to trip the shutter once in order to make a single exposure as described above. On the other hand it is also possible, as described above, to make such a single exposure by depressing and releasing the plunger 36.

Moreover, as was indicated above, it is possible to operate in a continuous mode without the interval set by the timing circuit means by maintaining the plunger 36 depressed, and it is in connection with this operation that the spring 38 is provided. Thus, when operating in this continuous mode, whenever the cam 24 returns the switch $SW_3$ momentarily into engagement with its terminal $a$, the lever 42 will turn in a clockwise direction to cause the pin 40 to slide upwardly in the sleeve which houses the spring 38 and which is fixed to the plunger 36, so that while the latter is maintained depressed it is possible for the switch means $SW_3$ to momentarily return to its terminal $a$ and the subsequent tripping of the shutter is immediately carried out through the force of the compressed spring 38 while the plunger 36 is maintained depressed.

As was indicated above, during a bulb exposure the switches $SW_5$ and $SW_6$ are opened by the operator in connection with setting the camera for a bulb exposure, and in connection with this operation the switches $SW_5$ and $SW_6$ shown in FIG. 2 are displaced to and from their solid to their dotted line positions. In the illustrated example the switch $SW_6$ is pivotally connected to a link 62 which in turn is pivotally connected to a push bar 64. This bar or rod 64 is pivotally connected to the switch $SW_2$ in the manner illustrated schematically in FIG. 2. Normally when the switches $SW_5$ and $SW_6$ are closed so that they are in their solid line positions, the rod 64 and link 62 will simply turn with the switch $SW_2$ without influencing the operations. However, when the bulb switches $SW_5$ and $SW_6$ are opened, the bar 64 is displaced to the dotted line position shown in FIG. 2, and a projection 66 thereof engages beneath the right end of the lever 46. Thus, at this time when the operator displaces the switch $SW_2$ from its terminal $a$ to its terminal $b$ in order to make a bulb exposure, the rod 64 will be displaced upwardly to turn the lever 46 in a counterclockwise direction about its pivot 48 so that the rod 50 will displace the switch $SW_3$ from its terminal $a$ to its terminal $b$, and at the same time the rod 30 will be raised to release the shutter. At the same time the rod 64 will engage behind a projection 68 of a shutter control member 70 which is displaced upwardly, as viewed in FIG. 2, by the rod 64 so as to maintain the shutter opened in a known way while the movement of the switch $SW_2$ into engagement with the terminal $b$ thereof will of course maintain the switches $SW_5$ and $SW_6$ in their open positions in the manner shown schematically in FIG. 2 and as described above in connection with FIG. 1.

As was pointed out above in connection with a bulb exposure, the bulb exposure is terminated by return of the switch $SW_2$ into engagement with its terminal $a$, and as is apparent from FIG. 2 when this operation takes place the switches $SW_5$ and $SW_6$ can be closed in order to terminate a bulb exposure operation. At the same time, since the projection 66 becomes displaced downwardly and away from the lever 46, the cam 24 is capable of acting through the switch $SW_3$ in the manner described above for returning the release means 30 to its initial position, with the operations taking place somewhat more rapidly because of the open switch $SW_5$ as described above.

What is claimed is:

1. In a camera capable of being operated either automatically to make a series of exposures or manually to make individual exposures at the option of the operator, film-advancing means for advancing film in the camera, electric motor means operatively connected with said film-advancing means for operating the latter, shutter means for exposing film, shutter-cocking means operatively connected between said shutter means and said motor means to be operated by the latter for cocking said shutter means in preparation for an exposure, shutter-release means operatively connected with said shutter means for releasing the latter, after it is cocked, to make an exposure, automatic shutter-tripping means operatively connected with said motor means to be driven thereby and cooperating with said shutter-release means for automatically tripping the latter to release said shutter means, manual shutter-tripping means operatively connected with said shutter-release means for manually tripping the latter to release said shutter means, and electrical circuit means operatively connected with said electric motor means for automatically energizing the latter upon completion of an exposure to drive said film-advancing means and shutter-cocking means for advancing the next unexposed film frame into a position for exposure and for cocking said shutter means in preparation for the next exposure, said circuit means including a manually operable switch means capable of being placed by the operator either in a continuous position or in a single-exposure position, said switch means when placed in said continuous position thereof controlling said circuit means for operating said electric motor means to actuate said automatic shutter-tripping means and when in said single exposure position thereof placing said circuit means in a condition requiring operation of said manual shutter-tripping means to trip the shutter-release means, said circuit means automatically actuating said electric motor means, upon displacement of said switch means from said continuous to said single-exposure position thereof, to stop operating only after actuating said film advancing means to advance the next unexposed film frame to an exposure position and said shutter-cocking means to cock the shutter means, so that immediately upon ending of operation in a continuous mode, said manual shutter-tripping means is available for tripping the shutter-release means and making an exposure, said electrical circuit means including a timing circuit means for controlling the interval from one exposure to the next when said manually operable switch means is in said continuous position thereof, and said manually operable switch means having two continuous positions in addition to said single-exposure position, said timing circuit means being effective in one of said continuous positions of said manually operable switch means, and said electrical circuit means including a bypass circuit means for bypassing said timing circuit means when said manually operable switch means is in the other of said continuous positions for making a series of exposures without said timing interval from one exposure to the next.

2. The combination of claim 1 and wherein an adjusting means is connected with said timing circuit means for adjusting said interval.

3. The combination of claim 1 and wherein said electrical circuit means includes a shutter-responsive switch means operatively connected with said shutter means to be actuated thereby for preventing energizing of said electrical motor means when said shutter means is in an open position, irrespective of the interval of said timing circuit means.

4. The combination of claim 3 and wherein said electrical circuit means includes a bulb switch means electrically connected with said shutter-responsive switch means for cancelling the effect thereof to render said circuit means operative to energize said motor means upon completion of a bulb exposure even before said shutter-responsive switch means assumes a position enabling said motor means to be energized.

5. The combination of claim 1 and wherein said electrical circuit means includes a bulb switch means electrically connected with said bypass circuit means for preventing operation thereof when a bulb exposure is made, said bulb switch means rendering said bypass circuit means operative at the termination of a bulb exposure.

6. The combination of claim 1 and wherein said electrical circuit means includes a control switch means movable between a shutter-release position and a film-advanced position, said control switch means automatically responding to operation of said shutter-release means to be displaced from said film-advance position to said shutter-release position and automatically responding to completion of a film-advancing operation to be displaced from said shutter-release position to said film-advanced position, and said control switch means being electrically connected with said manually operable switch means when the later is in its single-exposure position and said control switch means is in its shutter-release position while said control switch means is electrically connected with said manually operable switch means when the latter is in its continuous position and said control switch means is in said film-advanced position thereof, and said control switch means controlling said electrical circuit means to energize said motor means when said control switch means in either of its positions is electrically connected with said manually operable switch means, whereby when the latter is in its continuous position and said control switch means is in said film-advanced position thereof, a series of exposures will be continuously made while when said control switch means is in said film-advanced position thereof and said manually operable switch means is in said single-exposure position thereof, operation of said shutter-release means by said manual-shutter tripping means will displace said control switch means to said shutter-release position thereof to place said circuit means in a condition enabling said motor means to be energized until said control switch means returns to said film-advanced position thereof in response to completion of an exposure and advancing of the next film frame into an exposure position by said film-advancing means.

* * * * *